(12) United States Patent
Kessler et al.

(10) Patent No.: US 7,318,844 B2
(45) Date of Patent: Jan. 15, 2008

(54) LASER-IRRADIATED METALLIZED ELECTROCERAMIC

(75) Inventors: Reto Kessler, Zurich (CH); Felix Greuter, Rutihof (CH); Michael Hagemeister, Zurich (CH)

(73) Assignee: ABB Research Ltd, Zurich (CH)

( * ) Notice: Subject to any disclaimer, the term of this patent is extended or adjusted under 35 U.S.C. 154(b) by 293 days.

(21) Appl. No.: 10/885,877

(22) Filed: Jul. 8, 2004

(65) Prior Publication Data

US 2005/0016969 A1    Jan. 27, 2005

(30) Foreign Application Priority Data

Jul. 21, 2003    (EP) .................. 03405554

(51) Int. Cl.
*B23K 26/00* (2006.01)
*H01L 21/00* (2006.01)
*H01L 21/20* (2006.01)

(52) U.S. Cl. ............... 29/25.02; 29/610.1; 219/121.6; 219/121.85

(58) Field of Classification Search .................. None
See application file for complete search history.

(56) References Cited

U.S. PATENT DOCUMENTS

| | | | |
|---|---|---|---|
| 4,663,826 A | | 5/1987 | Baeuerle |
| 5,108,781 A | * | 4/1992 | Ranjan et al. ............... 427/556 |
| 5,338,334 A | * | 8/1994 | Zhen et al. .................... 75/362 |
| 5,473,138 A | * | 12/1995 | Singh et al. ........... 219/121.69 |
| 5,554,335 A | * | 9/1996 | Fields et al. ................. 264/400 |
| 5,635,089 A | * | 6/1997 | Singh et al. ........... 219/121.69 |

(Continued)

FOREIGN PATENT DOCUMENTS

JP    59-182284 A   * 10/1984

(Continued)

OTHER PUBLICATIONS

"Ceramic Transaction", vol. 3, Editor: L.M. Levinson, American Ceramic Society, 1988 or the publication D.R. Clarke, Varistor Ceramics, J. Am. Ceram. Soc., 82 (1999), pp. 485-502.

*Primary Examiner*—David E. Graybill
(74) *Attorney, Agent, or Firm*—Buchanan Ingersoll & Rooney PC (57) ABSTRACT

The manufacturing method for an electroceramic component (1), for example a varistor (1), comprises a laser irradiation of a part (5; 6) of the surface of an electroceramic body (2) before a metallization (3; 4) is applied to the part (5; 6) of the surface. By means of the laser irradiation it is possible to produce a micro-roughness and/or a chemical modification of the surface which permits good adhesion of the metallization, and it is possible to reduce or eliminate areas of unevenness or waviness of that part (5; 6) of the surface of the electroceramic body (2) which is to be metallized. In addition, improved transverse conductivity can be produced, by virtue of which a low contact resistance and a very homogeneous current distribution is achieved, in particular near to the metallization (3; 4). In addition it is possible to remove residues which originate in particular from a sinter support or from the application of a passivation layer. After the laser irradiation, the electroceramic body advantageously has a border (9) which adjoins the part (5; 6) of the surface and which is not laser-irradiated. The laser beam can advantageously be pulsed and focused.

31 Claims, 2 Drawing Sheets

U.S. PATENT DOCUMENTS

| | | | |
|---|---|---|---|
| 5,703,341 A * | 12/1997 | Lowndes et al. | 219/121.66 |
| 5,759,480 A * | 6/1998 | Hennings et al. | 264/620 |
| 5,834,094 A * | 11/1998 | Etsion et al. | 428/156 |
| 6,002,100 A * | 12/1999 | Etsion | 219/121.71 |
| 6,030,681 A * | 2/2000 | Czubarow et al. | 428/846.2 |
| 6,046,430 A * | 4/2000 | Etsion | 219/121.71 |
| 6,169,038 B1 | 1/2001 | Kruwinus et al. | |
| 6,350,506 B2 * | 2/2002 | Dickinson, Jr. | 428/156 |
| 6,569,397 B1 * | 5/2003 | Yadav et al. | 423/345 |
| 6,652,967 B2 * | 11/2003 | Yadav et al. | 428/403 |
| 6,716,525 B1 * | 4/2004 | Yadav et al. | 428/402 |
| 6,726,992 B1 * | 4/2004 | Yadav et al. | 428/403 |
| 6,786,950 B2 * | 9/2004 | Yadav et al. | 75/346 |
| 6,840,432 B1 * | 1/2005 | Ramarge et al. | 228/208 |
| 6,869,712 B2 * | 3/2005 | Mittelstadt et al. | 429/30 |
| 6,899,798 B2 * | 5/2005 | Weldon et al. | 204/298.11 |
| 7,123,467 B2 * | 10/2006 | Greier et al. | 361/321.2 |
| 2001/0044043 A1 * | 11/2001 | Badding et al. | 429/40 |
| 2003/0102099 A1 * | 6/2003 | Yadav et al. | 162/208 |
| 2003/0124043 A1 * | 7/2003 | Yadav et al. | 423/263 |
| 2003/0126948 A1 * | 7/2003 | Yadav et al. | 75/346 |
| 2003/0138368 A1 * | 7/2003 | Yadav et al. | 423/263 |
| 2004/0067355 A1 * | 4/2004 | Yadav et al. | 428/323 |
| 2005/0016969 A1 * | 1/2005 | Kessler et al. | 219/121.6 |
| 2005/0063889 A9 * | 3/2005 | Yadav et al. | 423/263 |

FOREIGN PATENT DOCUMENTS

| | | |
|---|---|---|
| JP | 04346693 A * | 12/1992 |
| JP | 11092952 A * | 4/1999 |
| JP | 2001319923 A * | 11/2001 |
| WO | 41 13 263 A1 | 10/1992 |

* cited by examiner

LASER-IRRADIATED METALLIZED ELECTROCERAMIC

TECHNICAL FIELD

The invention relates to the field of electrical engineering, in particular to electroceramic components such as, for example, varistors. It relates to a method for manufacturing an electroceramic component as claimed in the preamble of patent claim 1.

PRIOR ART

Electroceramic components are ceramic components with which electrical contact can be made and to which an electrical voltage can be applied in order to fulfill an electrical, electromechanical or some other function. Their essential component is an electroceramic. Examples of electroceramic components are high-temperature superconductor components, piezo crystalline components, ceramic capacitors, NTC thermistors and PTC thermistors, ceramic resistors, ceramic gas sensors and varistors. More details will be given on the latter below.

Varistors are electroceramic components which have a nonlinear current/voltage characteristic curve and which are used especially as arresters in medium voltage, high voltage and also low voltage applications. For the most part metal oxide varistors are used which are based on sintered varistor ceramics, for example on the basis of doped ZnO. In order to make contact with them, such electroceramics, and others, are generally provided with two (or more) metallic electrodes and the contacts have to have a low contact resistance and a high current carrying capacity. In addition, it is necessary for the metal layer to adhere strongly to the surface of the ceramic in order to ensure reliable and mechanically stable contact.

U.S. Pat. No. 6,169,038 discloses a method for roughening a surface of a semiconductor, in which the surface is etched with an acid. A micro-roughness of the surface is produced by means of the etching process. If a surface which has been roughened in such a way is provided with a metallization, a strong interlock is produced between the semiconductor and the metal layer owing to the micro-roughness so that good adhesion between the metal layer and the semiconductor surface is obtained. Similar etching methods are used in the manufacture of varistors and other electroceramic components.

In such etching methods, chemical waste which is to be disposed of occurs and costly safety measures have to be implemented when such methods are carried out owing to the risk of the chemicals which are used.

SUMMARY OF THE INVENTION

The object of the invention is therefore to provide a method of the type mentioned at the beginning which does not have the abovementioned disadvantages. The method according to the invention is intended in particular to make possible a safe and environmentally friendly metallization of an electroceramic.

This object is achieved by a method having the features of patent claim 1.

In the method according to the invention for manufacturing an electroceramic component, a metallization is applied to at least one part of the surface of a sintered electroceramic body. The method is defined in that the part of the surface is irradiated with laser light before the metallization is applied.

As a result, other methods for processing the part of the surface, such as etching, grinding, sand blasting or material-removing methods, can be replaced by the irradiation by means of a laser light which is an environmentally friendly and fast method. In addition, the laser irradiation can produce a particularly advantageous quality of the part of the surface.

A further significant advantage of the laser irradiation is that the shape of the part of the surface (to be metallized) can easily be selected in a virtually unrestricted way. In the case of wet chemical methods, it is necessary, for example, to attach masks to the electroceramic body in order to exclude parts of the surface of the electroceramic body from the treatment. In the case of laser irradiation, the laser beam can simply be controlled in such a way that only the part of the surface to be metallized is irradiated. As a result, metallizations (electrodes) which cover a defined area, a defined part, of the electroceramic body can easily be produced.

In particular, if the adhesion of the metallization on the electroceramic body is increased by the laser treatment, it is possible in particular to produce well defined electrode shapes with metallization methods which—at least without the use of masks—do not permit a metallization which can be satisfactorily restricted to a limited region of the surface (for example metal deposition from the gas phase or electrochemical metal deposition). In the regions of the surface which are not irradiated by laser, the adhesion of the deposited metal is then smaller than on the part of the surface so that the metal there can easily be removed from the electroceramic body, for example by brushing. Alternatively, the adhesion of the metal on the regions of the surface which are not irradiated by laser is so low that there is no deposition there, that is to say no metallization.

In particular if the electroceramic body has two outer surfaces which are separated from one another by means of at least one edge, in which case each of these two outer surfaces is to be provided with at least one metallization (electrode) and there is provision for a voltage to be applied between these two electrodes, the possibility of easily producing defined parts of the surface which are to be metallized is advantageous. Then, specifically at least one of the parts of the surface can be selected (and metallized) in such a way that it is spaced apart from the edge. There is then at least one border which is arranged between the edge and the part of the surface. In this way, the probability of an electrical flashover from one electrode to the other is reduced in comparison with the case in which the metallization extends as far as the edge. Both metallizations (electrodes) preferably have one border.

A further improvement in the dielectric strength is obtained if material of the electroceramic is removed by the laser irradiation in the part of the surface and if, after the laser irradiation, the electroceramic body has a border which adjoins the part of the surface, which border is not irradiated, or is irradiated less, with the laser light than the part of the surface. After the laser irradiation, a border which is not irradiated by laser (or irradiated less by laser) adjoins the part of the surface and is proud with respect to the part of the surface. The border projects beyond the part of the surface and can reduce the probability of electrical flashovers over the border, in particular if the border also projects beyond the metallization.

In comparison with other methods for preparing the part of the surface for metallization, laser irradiation can have the advantage that not only planar but also curved surfaces, for example an outer surface of a cylinder, can easily be processed.

The part of the surface can particularly advantageously be irradiated with the laser light in order to roughen the part of the surface. Such roughening has the purpose of anchoring the metallization to the electroceramic body particularly satisfactorily. Such roughnesses which are achieved have lateral extents of typically between 0.1 µm and 50 µm, usually between 2 µm and 20 µm, and vertical extents of typically between 0.1 µm and 10 µm, usually between 0.3 µm and 5 µm. It is possible to obtain a metallization which has particularly good adhesion and resistance to being pulled off. Increased roughness is obtained.

Before the metallization is applied, the part of the surface is advantageously irradiated with the laser light in order to improve the adhesion of the metallization by modifying the chemical quality of the part of the surface. Similarly to etching methods, the chemical composition of the surface of the electroceramic body can be changed by laser irradiation, for example by changing the stoichiometry of oxides on the surface. The adhesion of the metallization can even be improved by the modified chemical composition of the part of the surface.

The part of the surface can advantageously be irradiated with the laser light in order to increase the electrical transverse conductivity of the part of the surface.

The surface of a sintered electroceramic body usually has essentially the same electrical properties as the volume of the sintered electroceramic body. However, for a low contact resistance, a larger transverse conductivity is often desirable. The transverse conductivity which results from the current/voltage ratio in the case of two electrodes which are mounted spaced apart on the part of the surface can be significantly increased by the laser irradiation, in particular by several orders of magnitude.

In the case of a varistor, a very large electrical resistance is present, in particular when there are voltages below the switching voltage of the varistor (breakdown voltage). The transverse conductivity, which results from the current/voltage ratio in the case of two electrodes which are mounted spaced apart on the part of the surface, can be significantly increased by the laser irradiation, in particular by at least one or two or up to at least seven to nine orders of magnitude, depending on the voltage present at the varistor. Only a thin region of the surface is significant for the transverse conductivity.

In this way, a low contact resistance of the metallization with respect to the electroceramic body (varistor body) is obtained. The electroceramic (of the varistors) thus has more favorable electrical properties and improved contactability. The contact resistance can be significantly reduced.

The part of the surface usually has a waviness after the ceramic body has been sintered. This means that the part of the surface has deformations. Such areas of waviness or deformations have lateral extents of typically between 50 µm and 30 µm, usually between 100 µm and 10 mm, and vertical extents of typically between 5 µm and 500 µm, usually between 10 µm and 200 µm. This waviness of the part of the surface can be reduced by the irradiation with the laser light before the metallization is applied, that is to say the vertical extent of the areas of unevenness or waviness is reduced. The part of the surface is smoothed.

As a result, improved electrical and mechanical properties of the electroceramic component are obtained since the electrical field, the flow of current and the mechanical (pressure) loading is distributed more homogeneously.

For example, contact is often made with varistors under large mechanical pressure: in each case one contacting plate, typically made of aluminum, is pressed on two metallizations, advantageously arranged on opposite sides of the varistor, in order to ensure good electrical contact. If the waviness is then large (before the irradiation by laser), mechanical and electrical contact between the contacting plate and metallization occurs only at relatively few contact points on the part of the surface which have relatively large distances between them. As a result a very nonhomogenous application of force to the varistor body (electroceramic body) occurs when contact pressure is applied to the contacting plates. In addition, when there are current surges (current pulses), pressure surges (mechanical pressure waves) occur at the contact points which are larger, the smaller the number of contact points. Furthermore, current surges lead to local heating at the contact points. Each of the three aforesaid phenomena generally quickly leads to the formation of fissures in the ceramic. The fissures are usually near to the surface and their starting point is generally near to the (few) contact points. Such fissures degrade the electrical and mechanical contact between the metallization and ceramic as well as the varistor body. If the ceramic is irradiated with laser light before the metallization is applied in a suitable way, the waviness (above all its vertical dimension) can be significantly reduced so that a significantly larger number and density of contact points is present. Correspondingly, the use of laser irradiation for pretreating a varistor ceramic/an electroceramic for applying a metallization can significantly lengthen the service life of the varistor/of the electroceramic component. A homogeneous distribution of current and a homogeneous distribution of pressure over the entire metallized part of the surface is achieved. In the case of other electroceramics, analogous problems are solved by means of the irradiation by laser before the metallization.

In a particularly preferred variant of the manufacturing method, a focused laser beam is used as the laser light. In particular, before the application of the metallization, the part of the surface is irradiated with a focused laser beam in order to reduce the waviness of the part of the surface, as a result of which the part of the surface is leveled in a particularly satisfactory and efficient way. The energy density of the laser beam can be maximized in this way near to the surface of the electroceramic body, while further toward the interior of the ceramic body (below the surface) a reduced energy density, and thus a smaller influence on the ceramic material, is present. In particular, the laser beam is focused on an area which is arranged in parallel with an area which averages the waviness of the part of the surface. As a result particularly satisfactory leveling, and thus particularly low waviness of the part of the surface is achieved.

A further particularly preferred embodiment is characterized in that an amount of energy which is deposited per unit area in the part of the surface by means of the laser beam in order to level out a part of the surface which is curved before the irradiation by laser is selected as a function of the location on the part of the surface. In this way, selectively a If the amount of energy which is deposited per unit area in the part of the surface by means of the laser beam is selected as a function of the location on the part of the surface, is to be, this can advantageously be carried out by selecting a light output of the laser beam and/or a beam diameter of the laser beam and/or the area which is irradiated per time unit by the laser beam and/or a number of irradiations to which an area of the part of the surface is subjected as a function of the location on the part of the surface.

As a result, undesired deviations in shape with a vertical extent to the order of magnitude of typically 0.1 mm to 3 mm can be eliminated or at least significantly reduced. The laser beam can then move, for example, repeatedly over regions which are to be leveled and/or travel along more closely adjacent raster lines in regions which are to be leveled and/or travel along the raster lines more slowly and/or with greater light intensity. The ceramic is advantageously measured before or during the irradiation by laser, in order to determine the degree of deviation in shape and the correspondingly necessary laser intensity. A location-dependent removal of material is carried out on the part of the surface. In particular, larger areas of waviness or greater degrees of deviation in shape can be corrected than was possible when a focused laser beam was used without a location-dependent removal rate.

In a further advantageous embodiment of the invention, the electroceramic body has a particle structure and loose particles and/or particle composites of the electroceramic body are found to be present on the part of the surface, and/or particles and/or particle composites of the electroceramic body are found to be present at fissures in the particle structure. Before the metallization is applied, the part of the surface is irradiated with laser light in order to remove such particles and/or particle composites. Typical linear dimensions of such particles in varistors are between 10 μm and several 100 μm.

As a result of mechanical processing of the parts of the surface (for example through cutting, grinding or brushing), defects such as fissures may be formed in the ceramic body, in particular in the uppermost particle layers. The uppermost layer of a part of the surface is then often composed of a loose particle composite, which reduces the adhesion of the metallization. Such particles or particle composites which are loose or are arranged at fissures can be removed by means of the laser irradiation so that a good homogeneous electrical and mechanical contact (high tensile strength) between the ceramic and metallization is brought about.

During the sintering process, an electroceramic body is typically supported by at least part of the part of the surface on a sinter support. Parts of the sinter support may remain in the part of the surface after the sintering process is terminated. Such parts of the sinter support can advantageously be removed by irradiating the part of the surface with laser light before the metallization is applied. In this way, a homogeneous quality of the part of the surface is obtained, which is free of local differences in electrical properties which are caused by such parts of the sinter support.

Before and after the application of the metallization, the electroceramic body can be provided at least partially with a nonconductive passivation layer. If such a passivation layer is applied before the metallization is applied, parts of the passivation layer may be located on the part of the surface. In this case, the part of the surface is preferably irradiated with laser light before the application of the metallization in order to remove such parts of the passivation layer which are located on the part of the surface. Large or nonhomogeneous contact resistances between the metallization and electroceramic body which have arisen owing to such parts of the passivation layer are avoided so that uniform electrical properties and small resistances between the metallization and electroceramic body are achieved.

The electroceramic component may be, for example, a varistor or a high-temperature superconductor component or a piezo ceramic component or a ceramic capacitor or an NTC thermistor or a PTC thermistor or a ceramic resistor or a ceramic gas sensor.

If the electroceramic component is a varistor and the electroceramic body is a varistor body, the varistor body is preferably a doped sintered metal oxide ceramic, preferably based on $ZnO$, $SnO_2$, $SrTiO_3$ or $TiO_2$ or a doped carbide ceramic, for example SiC.

If the ceramic body is a varistor body, the part of the surface of a varistor body can highly advantageously be irradiated with laser light in order to reduce a voltage dependence of the transverse conductivity of the part of the surface. In particular, a varistor-like voltage dependence—present before the irradiation by laser—of the transverse conductivity can be converted into a (virtually) ohmic characteristic curve.

The surface of a sintered ceramic body generally has essentially the same electrical properties as the volume of the sintered ceramic body. A highly nonlinear current/voltage characteristic curve with a large electrical resistance in the case of voltages below the switching voltage (breakdown voltage) of the varistor is therefore found to be present. The strong voltage dependence of the transverse conductivity of the part of the surface can be reduced to such an extent that an essentially linear, that is to say ohmic, characteristic curve is found to be present. Instead of a varistor-like, highly nonlinear dependence of a current which flows in the part of the surface on a voltage which is present, after the irradiation by laser an essentially ohmic characteristic of the transverse conductivity is present (in a thin region of the surface). The varistor therefore has more favorable electrical properties and improved contactability.

In a further preferred embodiment, the electroceramic body is fashioned in an essentially cylindrical shape, disk shape or plate shape, in each case a part of the surface being arranged on the two boundary faces of the cylinder or of the disk or of the plate which are parallel with one another, on which two parts of the surface in each case one metallization is applied. The metallization is preferably applied by thermal spraying.

In a further preferred embodiment, the electroceramic body is essentially tubular or cylindrical, in each case a metallization being applied to two essentially annular parts of the surface which are spaced apart from one another axially and are arranged on the outer surface of the tube or cylinder. The metallization is preferably applied by thermal spraying.

In the use of laser light according to the invention, said light is used as a pretreatment for the application of a metallization to an electroceramic, in particular to a varistor ceramic.

Further preferred embodiments and advantages emerge from the dependent patent claims and the figures.

BRIEF DESCRIPTION OF THE DRAWINGS

The subject matter of the invention is explained in more detail below with reference to preferred exemplary embodiments which are illustrated in the appended drawings, in which, in each case schematically.

The reference symbols which are used in the drawings and their significance are listed in summarized form in the list of reference symbols. Identical or identically acting parts are always provided with identical reference symbols in the figures. The described exemplary embodiments are provided by way of example for the subject matter of the invention and have no restrictive effect.

WAYS OF EMBODYING THE INVENTION

Figure 1:
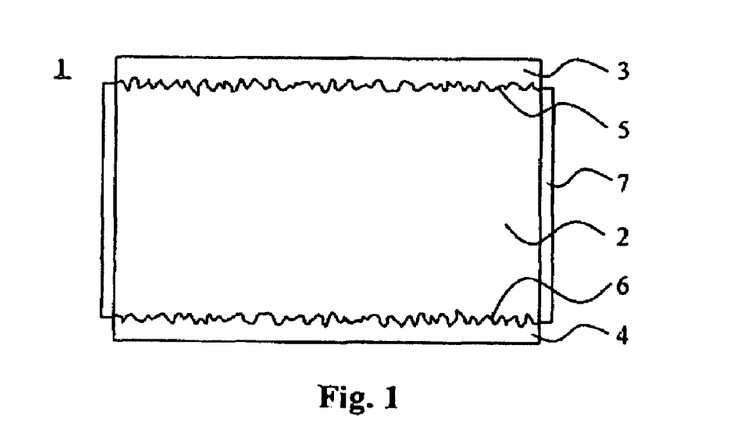
FIG. 1 shows a section through a varistor according to the invention.

FIG. 1 is a schematic view of a section through a varistor 1 which is manufactured according to the invention, as an example of an electroceramic component. The varistor is fashioned in an essentially cylindrical shape and has a varistor body 2. The top and bottom faces of the cylinder form parts 5 and 6 of the surface which are provided with metallizations 3 and 4. The nonmetallized cylindrical circumferential face is provided with a passivation layer 7.

The varistor 1 is preferably used for protection against overvoltage in high voltage, medium voltage or also low voltage applications. The general background to the subject matter of varistors and the preferably used materials can be found, for example, in the book "Ceramic Transaction", Vol. 3, Editor: L. M. Levinson, American Ceramic Society, 1988 or the publication D. R. Clarke, Varistor Ceramics, J. Am. Ceram. Soc, 82 (1999) pp. 485-502. The last mentioned publication is herewith incorporated with its entire disclosure in the description. The general background to the subject matter of electroceramics and the preferably used materials can be found, for example, in the book "Ceramic Materials for Electronics", Editor: Relva C. Buchanan, Electrical Engineering and Electronics/31, 1986.

The varistor body 2 is a sintered ceramic, preferably on the basis of a metal oxide, in particular ZnO. In addition to the base metal oxide, the varistor body 2 includes further elements as doping, for example Bi, Sb, Co, Mn, Cr. The varistor body 2 is preferably embodied in one piece.

The metallizations 3, 4 are used to form contact with the varistor body 2 and thus form electrodes 3, 4. The metallizations 3, 4 are to have a large current carrying capacity and a low contact resistance with the ceramic 2. In addition, they are to have good adhesion with the ceramic (high tensile strength). The metallizations 3, 4 are preferably made of Al, Zn, Cu, Ag or alloys such as, for example, brass.

The metallizations 3, 4 are applied to the parts 5 and 6 of the surface. The parts 5, 6 of the surface correspond to the bottom surface or top surface of the cylindrical varistor body 2 in FIG. 1. However, they may also be larger and include the bottom surface or top surface, or else be smaller and be included, if appropriate, by the bottom surface or top surface. In FIG. 1, the metallizations 3, 4 are arranged completely on the parts 5, 6 of the surface.

The passivation layer 7 is nonconductive and is preferably glass-like, ceramic or a polymer.

In order to manufacture the varistor 1, the components of the varistor ceramic 2 are mixed in powder form, pressed and then sintered supported on a sinter support at temperatures of typically between 900° C. and 1500° C. Coarse mechanical cleaning of the varistor ceramic 2 can then be carried out, for example by brushing.

The surface of a sinter ceramic 2 which is manufactured in this way is then irradiated entirely or preferably partially with laser irradiation. In the case of the varistor 1 illustrated in FIG. 1, the bottom and top surfaces are completely subjected to laser irradiation. The laser beam is preferably guided in a raster-like fashion over the surface to be irradiated. Preferred parameters for irradiation by laser are:

lightwave length 600 nm to 14 000 nm, preferably 900 nm to 1200 nm, in particular 1064 nm (Nd:YAG laser) or 10 600 nm ($CO_2$ laser)

pulsed beam, pulse frequency between 500 Hz and 80 kHz, preferably 5 kHz to 20 kHz (cw operation is also possible)

average laser power between 60 W and 200 W, preferably between 80 W and 200 W rate per unit area of the irradiation: 0.1 $cm^2$/s to 20 $cm^2$/s, preferably 0.5 $cm^2$/s to 4 $cm^2$/s.

Each surface segment is preferably irradiated only once, but it is also possible, and may be advantageous, to irradiate the same surface segment two or more times.

Since the region (scanning region) which is irradiated with the laser can be controlled electronically or in a computer-supported fashion, it is also possible to produce complex geometries and varistor bodies with a complex shape can be processed. For example, electrodes of rectangular shape and electrodes on an outer surface of a tubular or cylindrical varistor body, which extend for example along a circumference of the varistor body, can be implemented (see for example FIG. 6).

A focused laser beam is preferably used. Typical focal lengths are between 10 mm and 800 mm, preferably between 50 mm and 250 mm.

Figure 2:
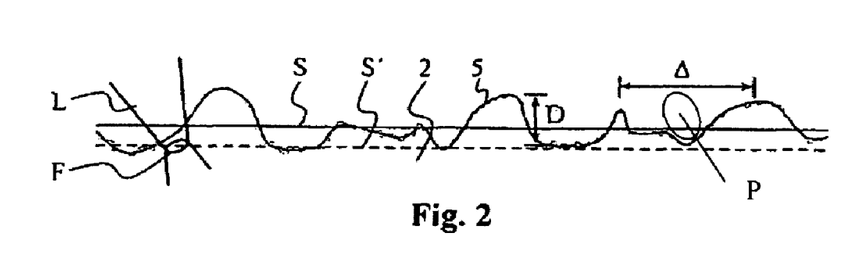
FIG. 2 shows a part of the surface before irradiation with laser light.

FIG. 2 is a schematic view of a section through a sintered varistor body 2 before the irradiation by laser. The laser beam L is indicated by its focal point F. The illustrated part 5 of the surface has a waviness which is due predominantly to impressions of the sinter support. This waviness typically has a lateral dimension Δ of the order of magnitude of 10 μm to several millimeters and a typical vertical dimension D of the order of magnitude of 10 μm to 0.5 mm. In FIG. 2, the thin wavy line which is drawn around the part 5 of the surface (illustrated by means of a thick line) shows that a sintered varistor body surface generally also has a certain (microscopic) roughness.

An area which averages the waviness of the part 5 of the surface is designated as S in FIG. 2. In the case of a top surface of a cylindrical varistor body 2 (cf. FIG. 1), the area S is a planar surface. Owing to an aimed at homogeneity of the electrical field in the varistor body 2, a planar shape of the electrodes 3, 4 is generally preferred so that the area S is preferably planar. A particularly suitable way of reducing the vertical dimension of the waviness is if the focus F of the laser beam L is guided in such a way that it is always located in an area S' which is parallel with the area S. The area S' is advantageously arranged on the side of the area S which faces the volume of the varistor body 2, preferably at a distance of 0.1 mm to 2 mm. Using a focused laser beam results in a depth-dependent energy density and removal power of the laser beam.

After the sintering, parts of the sinter support, schematically illustrated in FIG. 2 as P, may remain in the surface of the varistor body 2. Such components of the sinter support can be removed by the laser irradiation. It is also possible to remove other impurities, as schematically illustrated in FIG. 2 as P, from the surface of the varistor body 2 by means of the irradiation by laser. Mechanical coarse cleaning, for example brushing, can advantageously also take place before the irradiation by laser.

Figure 3:
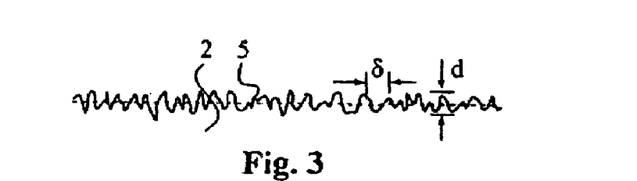
FIG. 3 shows a part of the surface after irradiation with laser light.

FIG. 3 is a schematic sectional view of an enlarged portion of a part 5 of the surface as shown in FIG. 2, after the irradiation by laser. The waviness is virtually eliminated. As a result, very homogenous field distributions and a uniform distribution of current is obtained. In addition, the part 5 of the surface has a roughness. This micro-roughness typically has a lateral dimension of the order of magnitude of 1 µm to 10 µm and a vertical dimension of the order of magnitude of 1 µm. The micro-roughness brings about good adhesion of the metallization on the part 5 of the surface which has been subjected to laser irradiation. Micro-roughness values $R_a$ which are preferably generated are 1 µm to 4 µm and are thus equal to, or even significantly greater than, the conventional micro-roughness values of typically 1 µm to 1.5 µm depth which are generated by means of etching.

The irradiation by laser is used specially for the pretreatment of the varistor ceramic 2 for the subsequent metallization. The metallizations 3, 4 are preferably applied to the parts 5, 6 of the surface by means of thermal spraying, for example light arc spraying. For metal layers which are applied by thermal spraying, a sufficient roughness of the surface to be metallized is particularly important since the adhesion is essentially mechanical and is not, or hardly, brought about by chemical means. Further metallization methods (coating methods) such as, for example, PVD, sputtering, electrochemical deposition or screen printing, are also possible.

Of course, an area can be irradiated by laser and only a part (specifically the part 5 or 6 of the surface) of said area is then metallized. For example, the entire bottom surface or top surface can be subjected to laser irradiation and then provided only partially with the metallizations 3, 4.

However, by means of the irradiation by laser, the chemical composition of the part of the surface can also be modified. In this way improved adhesion between the metallization and applied metal can be brought about.

Before and after the application of the metallizations 3, 4, the passivation layer 7 is advantageously applied. It constitutes an insulation layer. If the passivation layer 7 is applied before the metallizations 3, 4 are applied, nonconductive, glass-like or polymer residues may thus get onto the parts 5, 6 of the surface. Such residues which could lead to nonhomogeneities of the electrical field and electrical flashovers can be removed by means of the irradiation by laser.

Figure 4:
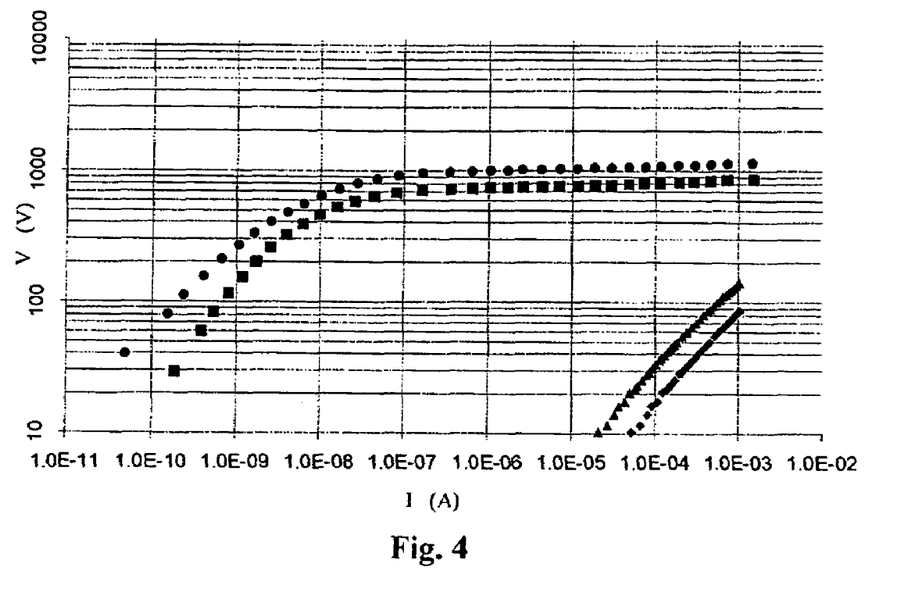
FIG. 4 shows current/voltage characteristic curves of parts of the surface of a varistor which are irradiated by laser and parts of the surface of a varistor which are not irradiated by laser.

In FIG. 4, current/voltage characteristic curves are illustrated in a double-logarithmic fashion and were measured by means of two electrodes applied to a part of the surface which has not been irradiated by laser (circles and squares) and to a part of the surface which has been irradiated by laser (triangles and lozenges) of a varistor body. The voltage V which is applied between the electrodes is plotted against the current I which flows between the electrodes. The distance between the electrodes was 3 mm for the data illustrated by squares and the data illustrated by lozenges. For the measurement points illustrated by circles and those illustrated by triangles, the electrode spacing was 4 mm. In the case of the data measured on parts of the surface which have not been subjected to laser irradiation (circles and squares), a varistor-like behavior is clearly apparent, with a breakdown voltage between 800 V and 1000 V. In the case of the data which has been measured on the part of the surface which has been irradiated by laser (triangles and lozenges), an ohmic behavior is clearly apparent. In addition, the contact resistance is significantly lower than without irradiation by laser. The transverse conductivity is increased drastically by the irradiation by laser. In the measured voltage range, the resistance is reduced by four to nine orders of magnitude.

Figure 5:
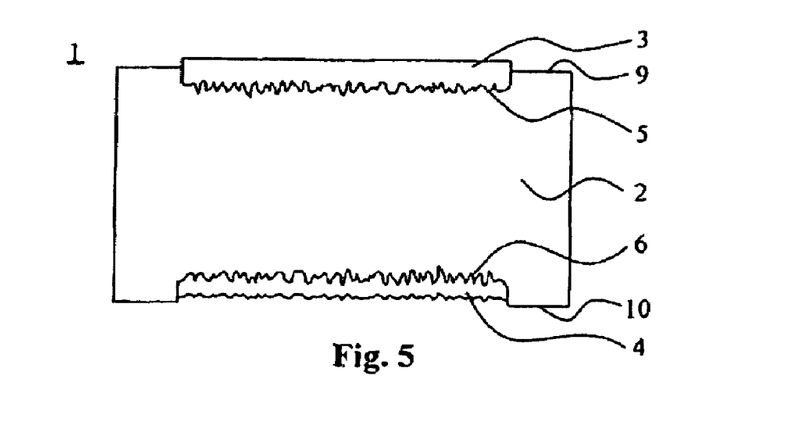
FIG. 5 shows a section through a disk-shaped varistor according to the invention with partially metallized surfaces.

FIG. 5 serves to illustrate the invention further and shows a similar varistor 1 to that in FIG. 1. For this reason, FIG. 5 is described on the basis of FIG. 1. In contrast to the varistor 1 in FIG. 1, the electrodes 3, 4 in FIG. 5 do not take up the entire top surface or bottom surface of the cylinder but rather only part of it so that in each case a border 9 or 10 which adjoins the parts 5 and 6 of the surface is produced. The borders 9 and 10 reduce the probability of an electrical flashover. If the metallizations 3, 4 extend, as in the example from FIG. 1, as far as the edge which separates the outer cylindrical surface from the top surface or bottom surface of the cylinder, an electrical flashover between the two metallizations when a voltage is applied would be much more probable than with the borders 9, 10 from FIG. 5.

It is clearly illustrated that as a result of the irradiation by laser of the parts 5, 6 of the surface, material has been removed. The borders 9, 10 project beyond the parts 5, 6 of the surface. The metallizations 3 and 4 are embodied in different ways in FIG. 6. However, two identical metallizations 3, 4 are rather normally preferred.

The metallization 3 of the part 5 of the surface is so thick that it projects beyond the border 9. This results in easier contactability by means of a contact element (not illustrated) which is at least approximately of the same size as the part 5 of the surface.

The adhesion of the metallization 3 on the part 5 of the surface is increased by the irradiation by laser. If any metal at all is capable of adhering to the border 9 during the metallization, said metal adheres there significantly less than the metal on the part 5 of the surface. As a result, metal which is possibly deposited on the border 9 can easily be removed so that an electrode geometry which is defined by the irradiation by laser is produced.

The part 6 of the surface is, in contrast to the part 5 of the surface, provided with such a thin metallization 4 that the border 10 projects beyond it. As a result, the border 10 forms an (additional) barrier against electrical flashovers.

Etching methods have the disadvantage that the ceramic bodies are positioned in an etching bath and the entire ceramic is therefore etched, that is to say both parts of the surface which are to be metallized and parts of the surface which are not to be metallized. This can have adverse effects on the electrical properties of the ceramic. It is difficult and complicated to cover parts of the surface which are not to be metallized, during the etching. Irradiation by laser does not require such masks.

Figure 6:
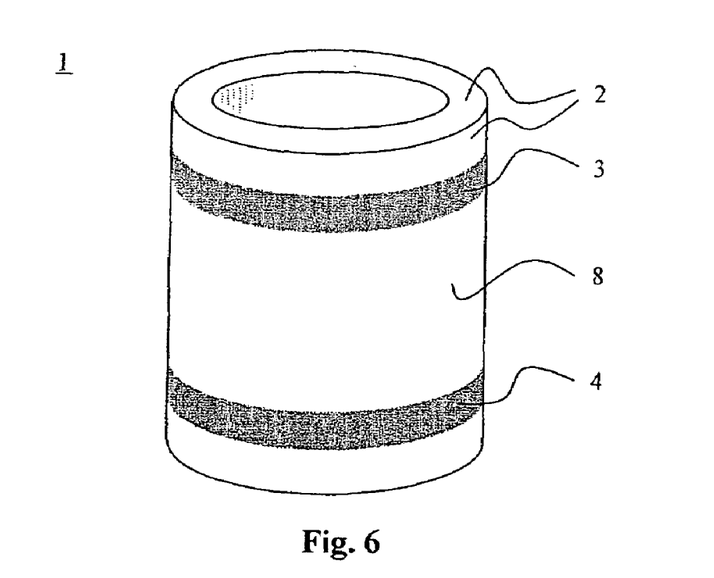
FIG. 6 shows a three-dimensional view of a tubular electroceramic with two annular electrodes.

FIG. 6 shows an example of nonplanar electrodes 3, 4. The electroceramic component 1 (for example varistor 1 or piezo ceramic 1) which is illustrated has a tubular ceramic body 2. The electrodes 3, 4 are arranged on the outer surface 8 of the small tube and are constructed in the form of a ring which surrounds the outer surface 8. Such parts of the surface, and also parts of the surface with more complex shapes, can be treated by means of the irradiation by laser.

The treatment by laser can basically be carried out in air or else in some other gas atmosphere (for example $N_2$, $H_2$, $O_2$). As a result, the conductivity and chemical composition of the irradiated part of the surface can be influenced.

By means of the inventive irradiation of a varistor body by laser, it is therefore possible to reduce or eliminate areas of unevenness or waviness of a part of the surface of the electroceramic body which is to be metallized, and it is possible to bring about a micro-roughness and a modification of the chemical surface composition of the part of the surface which permit good adhesion of the metallization. In addition, in varistor ceramics, a surface which conducts in at least virtually ohmic fashion with a large transverse conductivity can be produced, on the basis of which a very homogeneous distribution of current, in particular near to the metallization, is brought about. Furthermore, it is possible to remove residues which originate, in particular, from the sinter support or from the application of a passivation layer. Further advantageous effects and embodiments are mentioned above.

LIST OF REFERENCE SYMBOLS

1 Electroceramic component, varistor
2 Electroceramic, electroceramic body, varistor ceramic, varistor ceramic body
3, 4 Metallization, electrode
5, 6 Part of the surface
7 Passivation layer
8 Outer surface
9, 10 Border
d Typical vertical dimension of the roughness
D Typical vertical dimension of the waviness
$\delta$ Typical lateral dimension of the roughness
$\Delta$ Typical lateral dimension of the waviness
F Focus of the laser beam
L Laser light, laser beam
S, S' Area

The invention claimed is:

1. A method for manufacturing an electroceramic component, a metallization being applied to at least one part of the surface of a sintered electroceramic body, comprising irradiating the at least one part of the surface with laser light before the metallization is applied thereby physically removing electroceramic material from the at least one part of the surface, wherein a focused laser beam is used as the laser light before the metallization is applied, the part of the surface is irradiated with the laser light in order to reduce a waviness of the part of the surface, and the laser beam is focused on an area which is arranged in parallel with an area which averages the waviness of the part of the surface.

2. The manufacturing method as claimed in claim 1, wherein, after the laser irradiation, the electroceramic body has a border which adjoins the at least one part of the surface, which border is not irradiated, or is irradiated less, with the laser light than the at least one part of the surface.

3. The manufacturing method as claimed in claim 1, wherein, in order to roughen the part of the surface, the part of the surface is irradiated with the laser light before the metallization is applied.

4. The manufacturing method as claimed in claim 1, wherein, in order to improve the adhesion of the metallization by modifying the chemical quality of the part of the surface, the part of the surface is irradiated with the laser light before the metallization is applied.

5. The manufacturing method as claimed in claim 1, wherein, in order to increase the electrical transverse conductivity of the part of the surface, the part of the surface is irradiated with the laser light before the metallization is applied.

6. The manufacturing method as claimed in claim 1, wherein, after the sintering, the part of the surface of the electroceramic body has a waviness, and in that, before the metallization is applied, the part of the surface is irradiated with the laser light in order to reduce the waviness of the part of the surface.

7. The manufacturing method as claimed in claim 1, wherein an amount of energy which is deposited per unit area in the part of the surface by means of the laser beam in order to level out a part of the surface which is curved before the irradiation by laser is selected as a function of the location on the part of the surface.

8. The manufacturing method as claimed in claim 1, wherein the electroceramic component is a varistor or a high-temperature superconductor component or a piezo ceramic component or a ceramic capacitor or an NTC thermistor or a PTC thermistor or a ceramic resistor or a ceramic gas sensor, or wherein the electroceramic component is a varistor and the electroceramic body is a varistor body, and in that the varistor body is a doped sintered metal oxide ceramic, based on $ZnO$, $SnO_2$, $SrTiO_3$ or $TiO_2$, or a doped carbide ceramic.

9. The manufacturing method as claimed in claim 1, wherein the electroceramic component is a varistor and the electroceramic body is a varistor body and in that, before the application of the metallization, the part of the surface is irradiated with laser light in order to reduce a voltage dependence of the transverse conductivity of the part of the surface, before the application of the metallization, the part of the surface is irradiated with laser light in order to produce an ohmic voltage dependence of the transverse conductivity of the part of the surface.

10. The manufacturing method as claimed in claim 1, wherein either the electroceramic body is fashioned in an essentially cylindrical shape, disk shape or plate shape, in each case a part of the surface being arranged on the two boundary faces of the cylinder or of the disk or of the plate which are parallel with one another, on which two parts of the surface in each case one metallization is applied by thermal spraying, or the electroceramic body is fashioned in an essentially tubular shape or cylindrical shape, a metallization being applied by thermal spraying to two essentially annular parts of the surface which are spaced apart from one another axially and are arranged on the outer surface of the tube or cylinder.

11. An electroceramic manufactured according to claim 1.

12. The electroceramic component of claim 11, wherein the component is a varistor, or a high-temperature superconductor component or a piezo ceramic component or a ceramic capacitor or an NTC thermistor or a PTC thermistor or a ceramic resistor or a ceramic gas sensor.

13. The electroceramic component of claim 11, wherein the surface irradiated with laser light possess a reduced waviness.

14. The electroceramic component of claim 12, wherein the component is a varistor and comprises a substantially ohmic transverse conductivity.

15. A method for manufacturing an electroceramic component, a metallization being applied to at least one part of the surface of a sintered electroceramic body, comprising irradiating the at least one part of the surface with laser light before the metallization is applied thereby physically removing electroceramic material from the at least one part of the surface, wherein the electroceramic body has a particle structure, and in that loose particles and/or particle composites of the electroceramic body are found to be present on the part of the surface and/or particles and/or particle composites of the electroceramic body which are arranged in fissures in the particle structure are found to be present, the part of the surface being irradiated with laser light, before the application of the metallization, in order to remove such particles and/or particle composites.

16. The manufacturing method as claimed in claim 15, wherein, after the sintering, the part of the surface of the electroceramic body has a waviness, and in that, before the metallization is applied, the part of the surface is irradiated with the laser light in order to reduce the waviness of the part of the surface.

17. The manufacturing method as claimed in claim 15, wherein the electroceramic component is a varistor or a high-temperature superconductor component or a piezo ceramic component or a ceramic capacitor or an NTC thermistor or a PTC thermistor or a ceramic resistor or a ceramic gas sensor, or wherein the electroceramic component is a varistor and the electroceramic body is a varistor body, and in that the varistor body is a doped sintered metal oxide ceramic, based on ZnO, $SnO_2$, $SrTiO_3$ or $TiO_2$, or a doped carbide ceramic.

18. The manufacturing method as claimed in claim 15, wherein the electroceramic component is a varistor and the electroceramic body is a varistor body and in that, before the application of the metallization, the part of the surface is irradiated with laser light in order to reduce a voltage dependence of the transverse conductivity of the part of the surface, before the application of the metallization, the part of the surface is irradiated with laser light in order to produce an ohmic voltage dependence of the transverse conductivity of the part of the surface.

19. An electroceramic manufactured according to claim 15.

20. A method for manufacturing an electroceramic component, a metallization being applied to at least one part of the surface of a sintered electroceramic body, comprising irradiating the at least one part of the surface with laser light before the metallization is applied thereby physically removing electroceramic material from the at least one part of the surface the electroceramic body being supported during the sintering by at least part of the surface on a sinter support, wherein, before the application of the metallization, the part of the surface is irradiated with laser light in order to remove parts of the sinter support which have remained in the part of the surface after the sintering.

21. The manufacturing method as claimed in claim 20, wherein, after the sintering, the part of the surface of the electroceramic body has a waviness, and in that, before the metallization is applied, the part of the surface is irradiated with the laser light in order to reduce the waviness of the part of the surface.

22. The manufacturing method as claimed in claim 20, wherein the electroceramic component is a varistor or a high-temperature superconductor component or a piezo ceramic component or a ceramic capacitor or an NTC thermistor or a PTC thermistor or a ceramic resistor or a ceramic gas sensor, or wherein the electroceramic component is a varistor and the electroceramic body is a varistor body, and in that the varistor body is a doped sintered metal oxide ceramic, based on ZnO, $SnO_2$, $SrTiO_3$ or $TiO_2$, or a doped carbide ceramic.

23. The manufacturing method as claimed in claim 20, wherein the electroceramic component is a varistor and the electroceramic body is a varistor body and in that, before the application of the metallization, the part of the surface is irradiated with laser light in order to reduce a voltage dependence of the transverse conductivity of the part of the surface, before the application of the metallization, the part of the surface is irradiated with laser light in order to produce an ohmic voltage dependence of the transverse conductivity of the part of the surface.

24. An electroceramic manufactured according to claim 20.

25. A method for manufacturing an electroceramic component, a metallization being applied to at least one part of the surface of a sintered electroceramic body, comprising irradiating the at least one part of the surface with laser light before the metallization is applied thereby physically removing electroceramic material from the at least one part of the surface, the electroceramic body being provided, before the application of the metallization, at least partially with a nonconductive passivation layer, wherein, before the application of the metallization, the part of the surface is irradiated with laser light in order to remove parts of the passivation layer which are located on the part of the surface.

26. The manufacturing method as claimed in claim 25, wherein, after the laser irradiation, the electroceramic body has a border which adjoins the at least one part of the surface, which border is not irradiated, or is irradiated less, with the laser light than the at least one part of the surface.

27. The manufacturing method as claimed in claim 25, wherein, in order to roughen the part of the surface, the part of the surface is irradiated with the laser light before the metallization is applied.

28. The manufacturing method as claimed in claim 25, wherein, after the sintering, the part of the surface of the electroceramic body has a waviness, and in that, before the metallization is applied, the part of the surface is irradiated with the laser light in order to reduce the waviness of the part of the surface.

29. The manufacturing method as claimed in claim 20, wherein the electroceramic component is a varistor or a high-temperature superconductor component or a piezo ceramic component or a ceramic capacitor or an NTC thermistor or a PTC thermistor or a ceramic resistor or a ceramic gas sensor, or wherein the electroceramic component is a varistor and the electroceramic body is a varistor body, and in that the varistor body is a doped sintered metal oxide ceramic, based on ZnO, $SnO_2$, $SrTiO_3$ or $TiO_2$, or a doped carbide ceramic.

30. The manufacturing method as claimed in claim 25, wherein the electroceramic component is a varistor and the electroceramic body is a varistor body and in that, before the application of the metallization, the part of the surface is irradiated with laser light in order to reduce a voltage dependence of the transverse conductivity of the part of the surface, before the application of the metallization, the part of the surface is irradiated with laser light in order to produce an ohmic voltage dependence of the transverse conductivity of the part of the surface.

31. An electroceramic manufactured according to claim 25.

* * * * *